United States Patent [19]
Clark

[11] 3,978,929
[45] Sept. 7, 1976

[54] ROTOR TILLER WITH ATTACHMENT THEREFOR

[75] Inventor: Samuel H. Clark, Marysville, Calif.

[73] Assignee: The Raymond Lee Organization, Inc., New York, N.Y. ; a part interest

[22] Filed: June 16, 1975

[21] Appl. No.: 587,310

[52] U.S. Cl. .................................. 172/42; 172/63; 172/81; 172/201; 172/253; 172/274; 172/354
[51] Int. Cl.² .................... A01B 33/16; A01B 33/02
[58] Field of Search .................. 172/42, 43, 63, 73, 172/112, 253, 256, 257, 258, 259, 260, 508, 64, 71, 72, 81, 117, 126, 135, 197, 198, 199, 201, 202, 203, 272, 274, 354, 355, 356, 357, 358, 359, 382, 517, 672; 280/19, 19 S, 19 H

[56] References Cited
UNITED STATES PATENTS

| | | | |
|---|---|---|---|
| 658,306 | 9/1900 | Whitten | 172/203 |
| 692,660 | 2/1902 | Henry | 172/42 |
| 1,076,520 | 10/1913 | Rohrer | 172/203 |
| 1,661,122 | 2/1928 | King | 172/42 X |
| 2,532,580 | 12/1950 | Tom | 172/259 |
| 2,619,887 | 12/1952 | Burrows | 172/259 |
| 2,640,403 | 6/1953 | Halverson | 172/43 |
| 2,687,075 | 8/1954 | Hupp | 172/354 |
| 3,504,748 | 4/1970 | Croft | 172/42 |
| 3,524,508 | 8/1970 | West | 172/126 |
| 3,807,506 | 4/1974 | Penley | 172/42 |
| 3,907,039 | 9/1975 | Remley et al. | 172/15 |

FOREIGN PATENTS OR APPLICATIONS

| | | | |
|---|---|---|---|
| 1,228,964 | 3/1960 | France | 172/42 |

*Primary Examiner*—Richard T. Stouffer
*Attorney, Agent, or Firm*—Howard I. Podell

[57] ABSTRACT

A wheeled attachment arm assembly, mountable alongside a power rotor tiller apparatus to which a rake or a blade may be fastened for preparing the surface of the ground, prior to tilling it. The assembly incorporates an arm which is threaded into and extends laterally from the side of a rotor tiller machine, with a hinged bar fastened to a collar fitted on the arm and extending forward of the arm. A shield is fastened to the hinged bar to project forward of the bar, with the shield riding on a wheel fixed under the forward section of the shield. A vertical support member is fastened under the shield to the bar, with attachment structure for fastening a rake, hoe or grading blade to the vertical support member.

4 Claims, 3 Drawing Figures

ROTOR TILLER WITH ATTACHMENT THEREFOR

SUMMARY OF THE INVENTION

My invention is a wheeled attachment arm assembly, mountable alongside a power rotor tiller apparatus to which a rake or a blade may be fastened for preparing the surface of the ground, prior to tilling it. The assembly incorporates an arm which is threaded into and extends laterally from the side of a rotor tiller machine, with a hinged bar fastened to a collar fitted on the arm and extending forward of the arm. A shield is fastened to the hinged bar to project forward of the bar, with the shield riding on a wheel fixed under the forward section of the shield. A vertical support member is fastened under the shield to the bar, with attachment means for fastening a rake, hoe or grading blade to the vertical support member.

In use, the attached blade or rake prepares a swath of ground adjacent to the swath being tilled by the rotor tiller, with the shield serving to lift vines or vegetable matter, above the ground level, away from the blade of the attachment and the rotating tiller blades.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
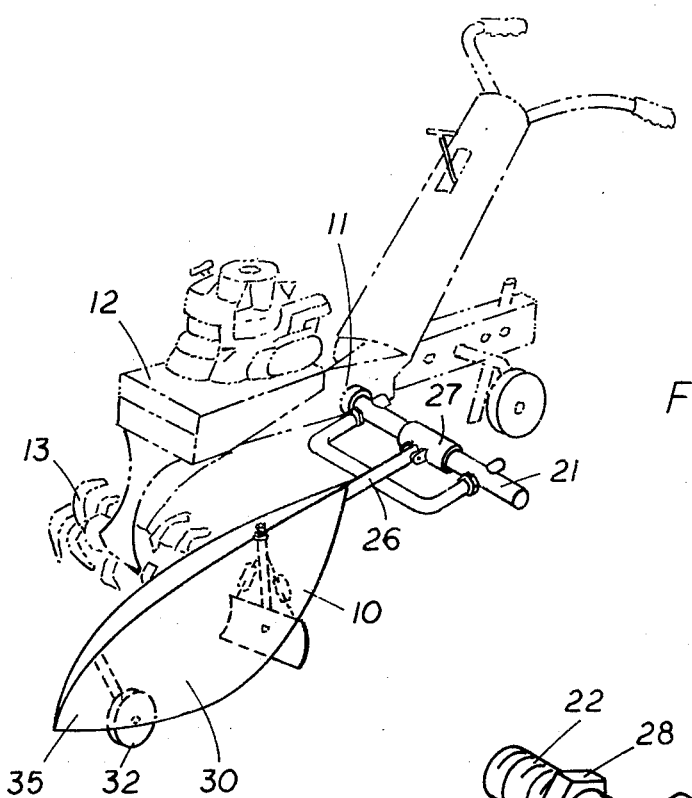
FIG. 1 is a perspective view of the invention assembled for use.
Figure 2:
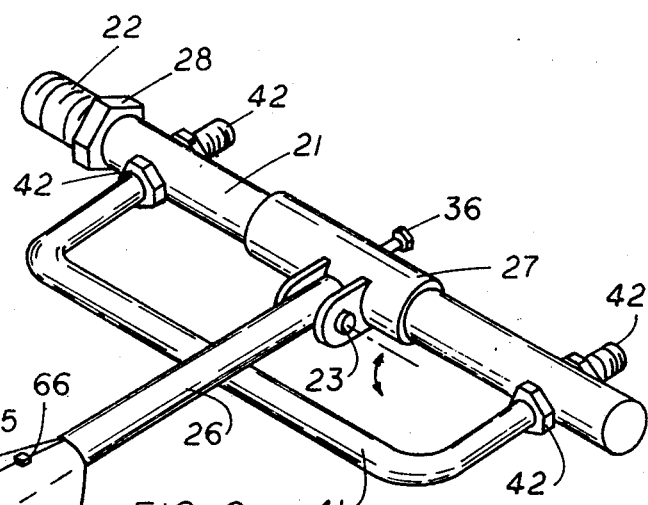
FIG. 2 is a perspective view of the invention.
Figure 3:
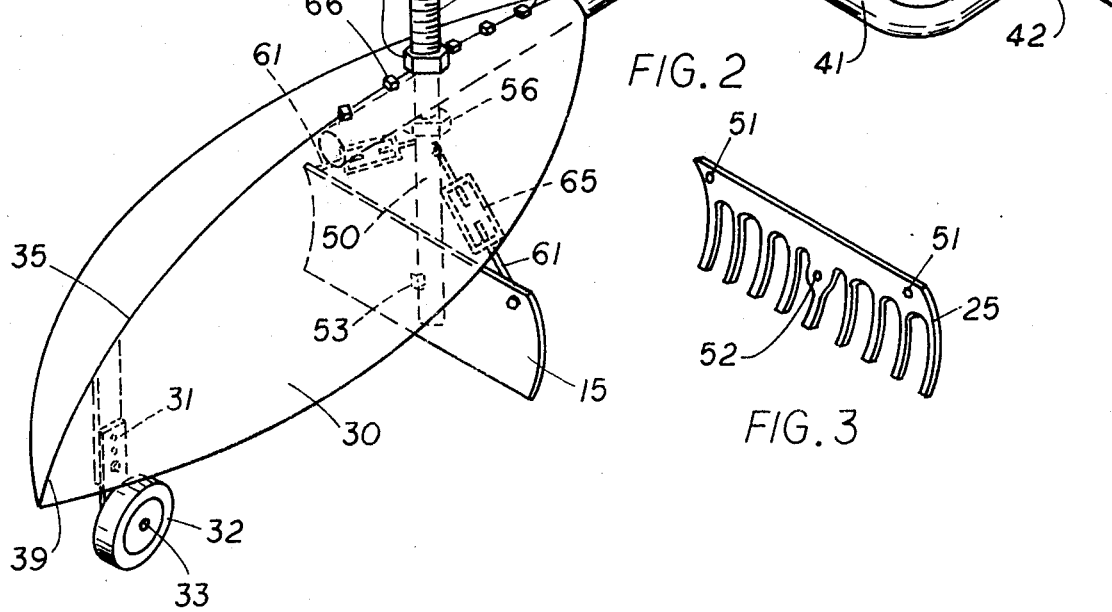
FIG. 3 is a perspective view of an attachable rake blade.

Turning now descriptively to the drawings, in which similar reference characters denote similar elements throughout the several views, FIGS. 1–2 illustrate the attachment assembly 10 which fastens to the side of the frame 11 of a rotor tiller machine 12 to enable clearing a swath of ground adjacent to the swath cultivated by the tiller blades 13 of the rotor tiller machine 12 so that the swath cleared by the blade 15 of the attachment 10 may be more readily tilled on the next pass of the rotor tiller machine 12 over the cultivated area.

As shown in FIGS. 1–2, the assembly 10 is formed of a mounting arm 21, that fastens to the frame 11 of a rotor tiller 12 so as to extend laterally in a horizontal plane from the rotor tiller 12, with a mounting bar 26 pivotably fastened by a pin 23 a collar 27 fitted on the mounting arm 21 so that mounting bar may extend forward of the assembled mounting arm 21. A shaped shield 30 is fastened over the mounting bar 26, with a grading blade 15, hoe blade, or rake blade 25 fastened under shield 30 to the mounting bar 26.

A bracket 31, on which a wheel 32 is rotatably mounted by axle pin 33, is fastened to the underside of the forward section 35 of shield 30 to support the assembly 10 in relation to the ground level on which wheel 32 rides. A U-shaped rest bar 41 is fixed through holes in mounting arm 21 by nuts 42 over the threaded ends 43 of the rest bar 41, with rest bar 41 extending forward of mounting arm 21, in the assembled position, to serve as a support means for the mounting bar 26 and attached shield 30 and blade 15, when wheel 32 is not in contact with the ground level. Collar 27 to which mounting bar 26 is hinged, may be rotated about mounting arm 21 and fixed in position by means of a screw 36 threaded into collar 27 to bear, when tightened, against arm 21.

Arm 21 is formed with a male thread 22 at one end for joining to a mating female thread in a hole in the frame 11 of the rotor tiller 12 and the joint is held in place by a nut 28 mounted on thread 22 which can be tightened against the frame 11 in the assembled position.

The blade 15 or rake 25 is fastened by a bolt 53 through hole 52 to a vertical support bar 50, with support bar mounted to mounting bar 26 to extend vertically below mounting bar 26 in the assembled position through a hole in bar 26. Support bar 50 is formed with a male thread 55 that extends through the hole in mounting bar 20 to be fastened to shield 30 and support bar 26 by means of nuts 56 to provide adjustable means for fixing support bar 50 and attached blade 15 at the proper height below mounting bar 26.

Blade 15 or 25 is also supported on each side by a diagonal strut 61 fastened through hole 51 in the blade 15 or 25, with strut 61 fixed to vertical support bar 50. A turnbuckle 65 may be fastened to each strut 61 to maintain proper tension of the strut 61.

Blade 15 is preferably formed of a curved sheet to serve as a grader and may be readily replaced by a rake blade 25, or a hoe or plow-shaped blade, as desired.

Shield 30 is fastened to mounting bar 26 over blade 15 by bolts 66 fastened through holes in the shield 30 to the mounting bar 26. Shield 30 is formed with a pointed nose section 39 and is shaped to cover both sides of blade 15.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. In combination with a rotor tiller machine, said machine including a frame with handle bar means extending rearwardly therefrom for guidance of said machine by a walking attendant, said machine further including rotary tiller blade means forwardly of said handle bar means for cultivating a swath of ground as said machine travels forwardly over the ground, an attachment assembly mounted on said rotor tiller machine and extending alongside of and away from the rotor tiller machine for the purpose of preparing a swath of ground adjacent to the swath cultivated by the rotor tiller, said assembly comprising a first arm member fixed to a side of said frame of said rotor tiller machine and projecting away from said frame of said rotor tiller machine, a second arm member rotatably hinged to the first arm member so as to extend away from said first arm member in the direction of forward travel of said rotor tiller machine, a vertical support member fixed to the said second arm member to extend from the second arm member, together with means to fasten a blade to said support member, said members oriented with respect to each other on said machine so that in the assembled position of use for preparing said swath of ground, the vertical support member extends below the second arm member in a position forwardly of the first arm member.

2. The combination as recited in claim 1 in which a wheel is rotatably mounted to a support which is joined to the second arm member so as to support a blade when fastened to the vertical support member in a relatively uniform relation to the ground level on which said wheel rests.

3. The combination as recited in claim 2 in which a shield is mounted over the second arm member, said shield shaped of sheet material and formed with a generally pointed nose section that extends forward and about the wheel of the assembly, with the rear section of the shield extending over the vertical support member so as to extend over a blade when fastened to said vertical support member.

4. The combination as recited in claim 1 in which the first arm member is fitted with support means for supporting the underside of the second arm member, when the second arm member is rotated to a first position contacting said support means, said support means permitting the second arm member to rotate to a second position, away from the said support means.

* * * * *